(12) United States Patent
Wang et al.

(10) Patent No.: US 10,694,270 B1
(45) Date of Patent: Jun. 23, 2020

(54) ACCELERATED MONITORING OF OPTICAL TRANSCEIVERS

(71) Applicant: Facebook, Inc., Menlo Park, CA (US)

(72) Inventors: Xu Wang, Fremont, CA (US);
Rongchun Zhou, Los Gatos, CA (US);
Olaf Moeller, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/403,913

(22) Filed: May 6, 2019

(51) Int. Cl.
*H04B 10/08* (2006.01)
*H04Q 11/00* (2006.01)
*H04B 10/40* (2013.01)
*H04B 10/079* (2013.01)

(52) U.S. Cl.
CPC ... *H04Q 11/0066* (2013.01); *H04B 10/07955* (2013.01); *H04B 10/40* (2013.01); *H04Q 2011/0083* (2013.01)

(58) Field of Classification Search
CPC ........... H04Q 11/0062; H04Q 11/0066; H04Q 11/0067; H04Q 11/0003; H04Q 11/0005; H04B 10/032; H04B 10/035; H04B 10/038; H04B 10/40; H04J 14/0227; H04J 14/0212; H04J 14/0256; H04J 14/0272; H04L 45/74; H04L 49/405
USPC ........ 398/79, 45, 48, 49, 50, 51, 53, 55, 56, 398/57, 33, 38, 25, 26, 27, 135, 136, 46, 398/47, 58, 2, 3, 5, 10, 13, 23, 24, 17, 398/22; 370/218, 252, 389, 392, 474, 370/476, 401
See application file for complete search history.

(56) References Cited

U.S. PATENT DOCUMENTS

| 2012/0271930 A1* | 10/2012 | Tsuchida | H04L 49/40 709/223 |
| 2016/0007102 A1* | 1/2016 | Raza | H04Q 11/0005 398/45 |
| 2016/0204856 A1* | 7/2016 | Yin | H04B 10/038 398/5 |

* cited by examiner

*Primary Examiner* — Hanh Phan
(74) *Attorney, Agent, or Firm* — Van Pelt, Yi & James LLP

(57) ABSTRACT

In an embodiment, a system for accelerated monitoring of optical transceivers includes a monitoring unit included in a port interface module of a network switch. The monitoring unit is configured to receive a monitoring configuration, obtain status information from a plurality of optical transceivers connected to the port interface module at an instance based on the monitoring configuration, and store the obtained status information and at least one associated timestamp in a memory. The memory is included in the port interface module and configured to provide the stored status information to a requestor external to the port interface module.

20 Claims, 7 Drawing Sheets

US 10,694,270 B1

ACCELERATED MONITORING OF OPTICAL TRANSCEIVERS

BACKGROUND OF THE INVENTION

Optical transceivers are often used for telecommunications and data communications. The transceivers can be monitored to assess their performance and detect degradation or failure. Digital optical monitoring refers to the monitoring of parameters of optical transceivers such as TX power, RX power, temperature, and supply voltage. The monitoring can help diagnose transceiver performance issues. Conventionally, a CPU performs digital optics monitoring by instructing optical transceivers to report conditions. This can be slow and inefficient.

BRIEF DESCRIPTION OF THE DRAWINGS

Various embodiments of the invention are disclosed in the following detailed description and the accompanying drawings.

DETAILED DESCRIPTION

Figure 1:
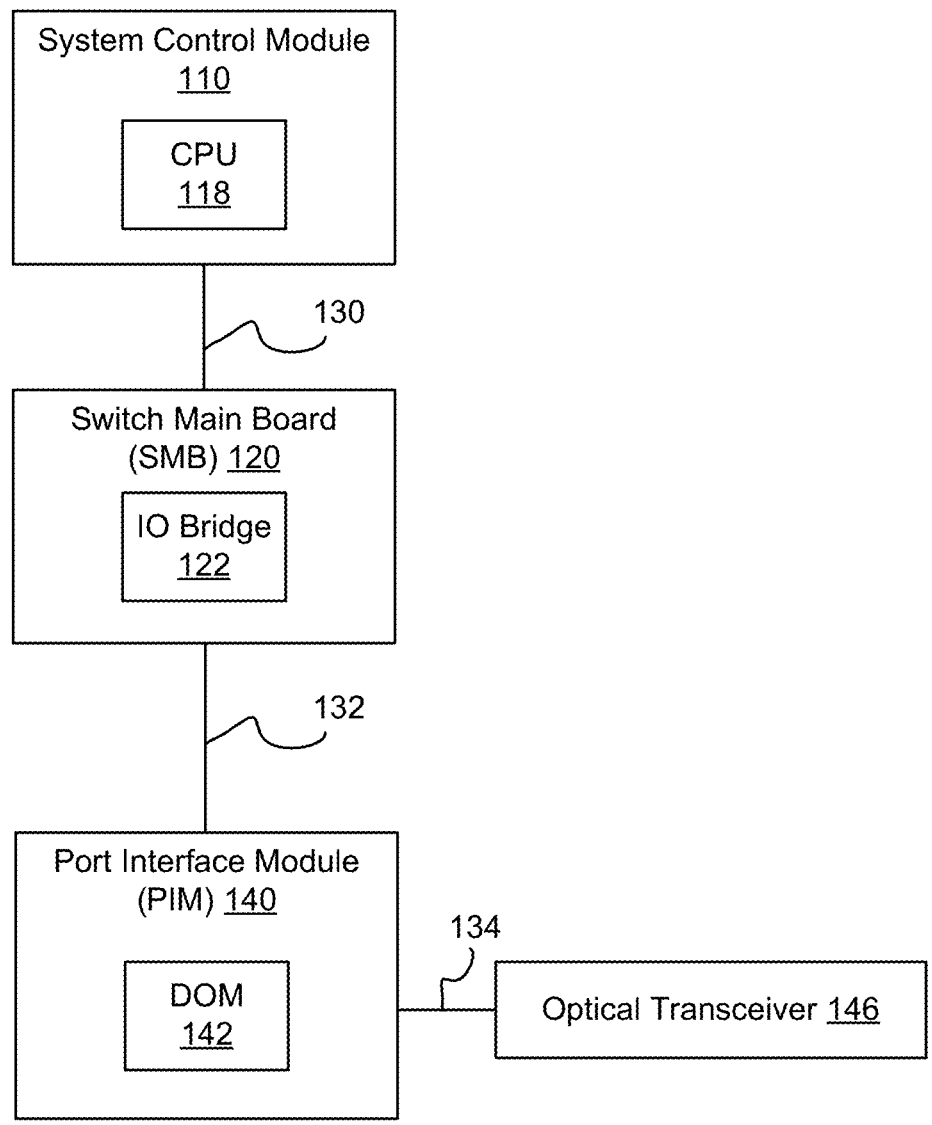
FIG. 1 is a block diagram illustrating an embodiment of a network switch having a system for monitoring digital optics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Accelerated monitoring of optical transceivers is disclosed. Unlike conventional digital optics monitoring where a CPU of a main system reads optical transceiver data over a slow connection, the disclosed digital optics monitoring techniques offload the monitoring from being performed by the CPU to being performed by a monitoring unit onboard a port interface module. The digital optics monitor (DOM) collects optical transceiver data of transceivers plugged into the port interface module. When a CPU requests information about the transceivers, the digital optics monitor has already collected the data and reports it to the CPU over a faster connection such as PCIe or LPC, thus improving the speed and efficiency of digital optics monitoring.

In various embodiments, the system includes a central processor (CPU), a digital optics monitor, and optical transceivers. The CPU and digital optics monitor are coupled over a relatively fast connection while the optical transceivers are coupled to the rest of the system over a relatively slow connection. For example, communication with an optical transceiver is performed via an Inter-Integrated Circuit (I2C) bus (e.g., a synchronous, multi-master, multi-slave, packet switched, single-ended, serial computer bus). The digital optics monitor collects and stores status data (e.g., periodically) and when the CPU requests this data, the digital optics monitor reports it over a relatively fast connection (e.g., over a peripheral component interconnect express (PCIe) bus) since it already has this data. The CPU need not wait for the optical transceivers to respond over their slow connections. The monitoring acceleration function can be applied to a network switch such as (but not limited to) Facebook® Minipack. An example of a network switch is further discussed below.

The following figure shows an example of a network switch in which digital optics can be monitored using the disclosed techniques.

FIG. 1 is a block diagram illustrating an embodiment of a network switch having a system for monitoring digital optics. The network switch includes system control module (SCM) 110, switch main board (SMB) 120, port interface module (PIM) 140, and optical transceiver 146.

System control module 110 includes CPU 118, which is configured to provide control functions of the network switch such as managing packet flows, port configuration, and monitoring and diagnosing transceiver issues. The CPU can be implemented by a variety of processors such as a microserver compliant with the COM Express standard. In various embodiments, the system control module provides a primary PICe interface for the CPU to communicate with a switch chip such as an Ethernet switch chip (e.g., Broadcom Tomahawk® 3). The system control module may also provide a secondary PCIe interface for PIM DOM (FPGA) control.

Switch main board 120 is configured to provide data plane functions and management plane functions. The switch main board includes a switch circuit, a board management controller, and interfaces for port interface modules. The switch circuit is communicatively coupled to the CPU 118 via link 130. In various embodiments, the CPU and switch circuit communicate over link 130 using the primary PCIe interface. In various embodiments, the switch main board provides a USB device for CPU 118 to access slave I2C buses on the port interface module. CPU 118 may use the I2C bus to access digital optical diagnostics data.

Figure 4:
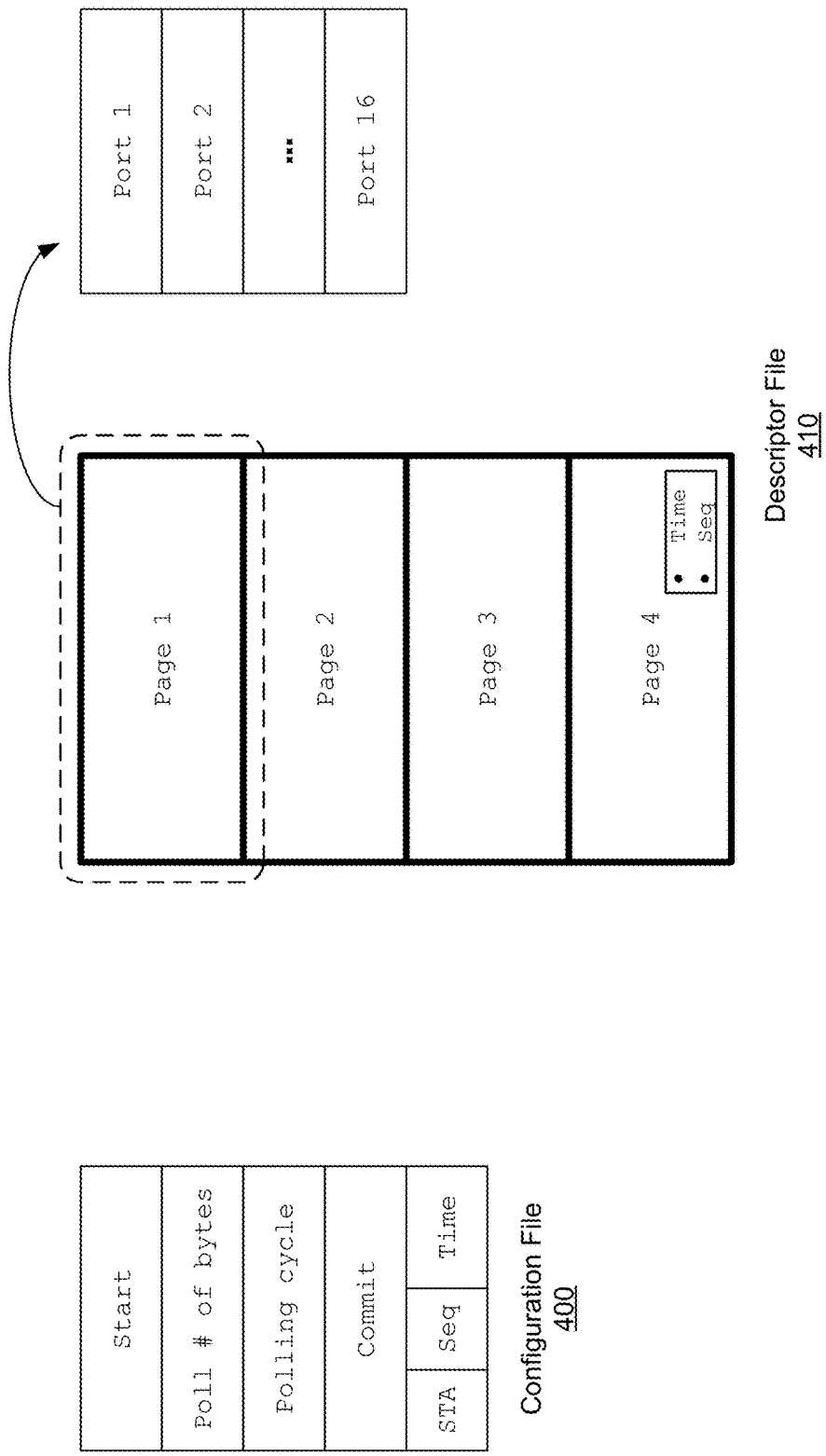
FIG. 4 illustrates an example of register definitions and contents obtained in some embodiments.

CPU 118 is configured to provide instructions such as configuration files to port interface module 140. The configuration file can be used by a monitoring unit to determine how (what information, frequency, etc.) to gather data from optical transceivers. An example of a configuration file is shown in FIG. 4.

Switch main board 120 includes an IO Bridge 122, which is configured to communicate with port interface module 140 (more specifically to a digital optics manager 142). Examples of specific protocols the IO Bridge and digital optics manager may use are further described in FIG. 2.

Port interface module 140 provides network interface connectivity for the network switch. The port interface module receives data packets and forwards the data packets to the destination. The port interface module supports a variety of card configurations such as Quad Small Form-factor Pluggable (QSFP), dense wavelength division multiplexing (DWDM), and the like including transceivers defined by standards-setting bodies such as the Consortium for On-Board Optics (COBO). One type is a QSFP line card which has 16 slots supporting 100G per slot. Another type is a QSFP-DD network switch, which has 4 slots supporting 400G per slot. Other configurations are also possible, such as 8×QSFP56 200G or a mixture of 100G, 200G, or 400G slots. For example, the system supports one or more SCL frequencies in a single system (e.g., 100 KHz, 400 KHz, 1 MHz, or higher SCL frequency).

Port interface module 140 includes digital optics monitoring unit 142, which is configured to monitor digital optics performance. The monitoring unit enables optics monitoring to be offloaded from the CPU 118 as further described in FIG. 2. This improves the performance and speed of digital optics diagnostics.

Optical transceiver 146 plugs into a port interface module to provide access functions. For example, an optical transceiver passes (transmits or receives) an optical signal to the port interface module, the port interface module converts the signal to a signal for the switch chip to route to the destination. Optical transceivers are important for the functioning and speed of the network switch and, consequently, for an entire data center. End users may experience delays if optical transceivers do not perform well due to temperature, breaking, etc. Thus, one of the things that the system control module does is monitor the digital optical transceiver status information such as temperature, current, supply voltage, optical power such as receive (RX) power, transmit (TX) bias, transmit (TX) power, interrupt status, and other diagnostic parameters including those defined by standards bodies such as SNIA. As discussed above, conventional digital optical monitoring techniques can be slow or inefficient, causing a delay in troubleshooting.

An external requestor such as system control module 120 and port interface module 140 are coupled by connection 132 while monitoring unit 144 and optical transceiver(s) 146 are coupled by connection 134. Connection 132 is typically implemented by a relatively fast connector such as an LPC (or proprietary LPC) connection while connection 134 is typically implemented by a relatively slow connector such as I2C.

Unlike a conventional system in which the CPU actively polls the optical transceivers for digital optics data by instructing a specific transceiver to report information, the monitoring unit in the port interface module accelerates digital optics monitoring. A conventional system manually or periodically polls the optical transceivers to obtain sensor readings when they are needed. By contrast, the system shown here receives a provisional configuration file that specifies a section and what kind of data to poll. Thereafter, digital optics manager 142 automatically collects data and stores them locally to report to the CPU when the information is requested. From the perspective of the CPU, digital optics data is quickly obtained via fast link 132 and relatively slow link 134 is no longer a bottleneck.

In operation, monitoring unit 142 collects performance data from the optical transceivers 146. The monitoring unit can collect the data according to instructions (a monitoring configuration) initially sent by CPU 118. The CPU can send the instructions once and need not repeatedly send instructions each time it wants data from a transceiver. The configuration can define instances (offsets or times) to obtain status information as further described below. At an instance indicated in the monitoring configuration, the monitoring unit gets status information from optical transceiver(s) connected to the port interface module. The monitoring unit stores the status information and associated timestamp(s) in the memory. Upon request from an external requestor (such as CPU 118 which is external to the port interface module), the stored status information is provided to the external requestor.

The number of optical transceivers is merely exemplary and not intended to be limiting. For simplicity only one optical transceiver is shown here but naturally the port interface module can be configured to accommodate additional transceivers. One example port interface module is configured to accept up to 16 QSFP transceivers as shown in the next figure.

IO Bridge 122 and DOM 142 may be implemented by a variety of devices including a field programmable gate array (FPGA) or an application specific integrated circuit (ASIC). The techniques described here can be applied to a variety of devices including FPGAs and ASICs.

Figure 6:
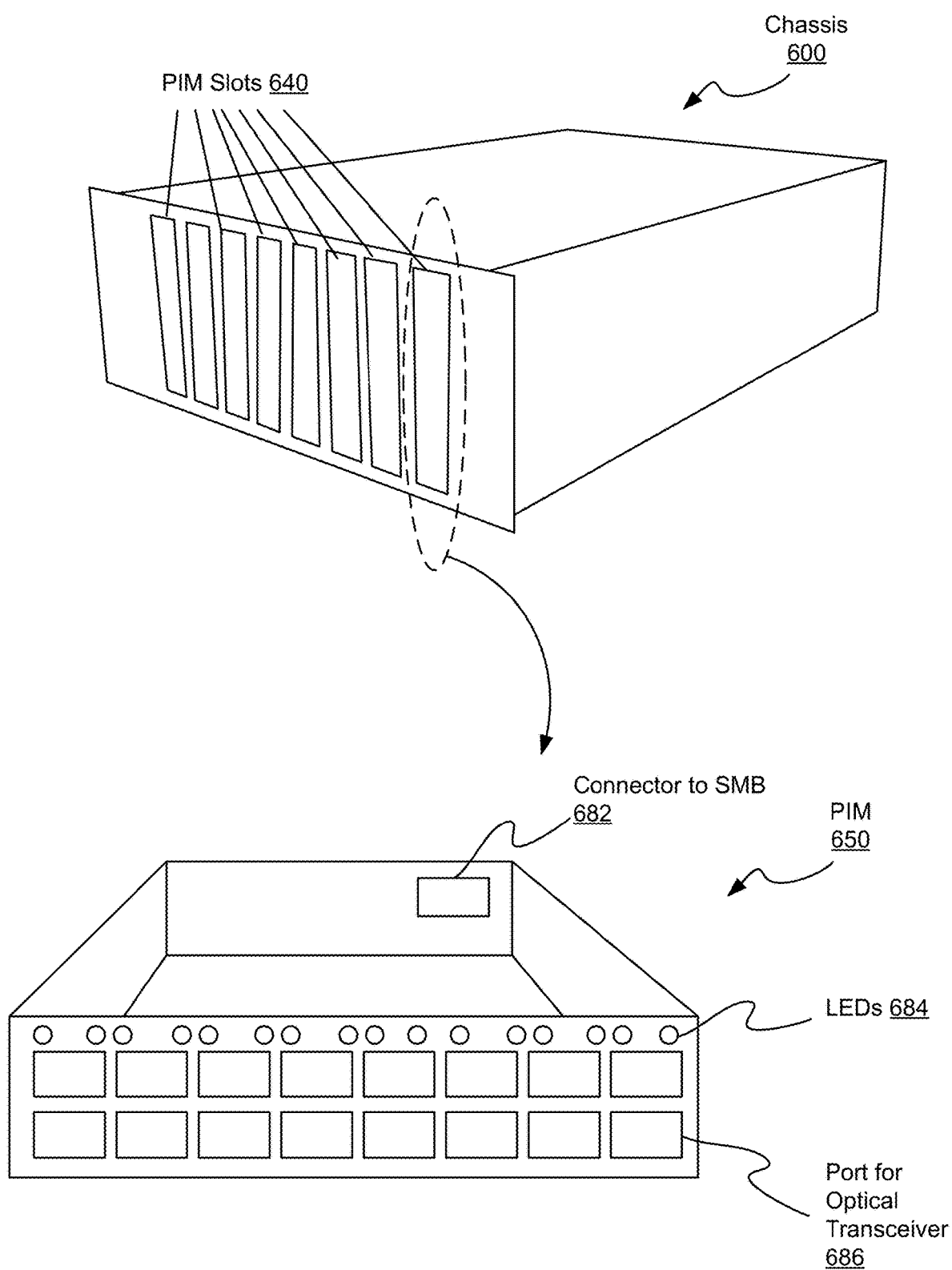
FIG. 6 is a diagram illustrating an embodiment of a system for monitoring digital optics.

Examples of a physical form factor of a system control module, switch main board, port interface module, and optical transceivers are shown in FIG. 6. The next figure shows more details of IO bridge 122 and digital optical manager 142.

Figure 2:
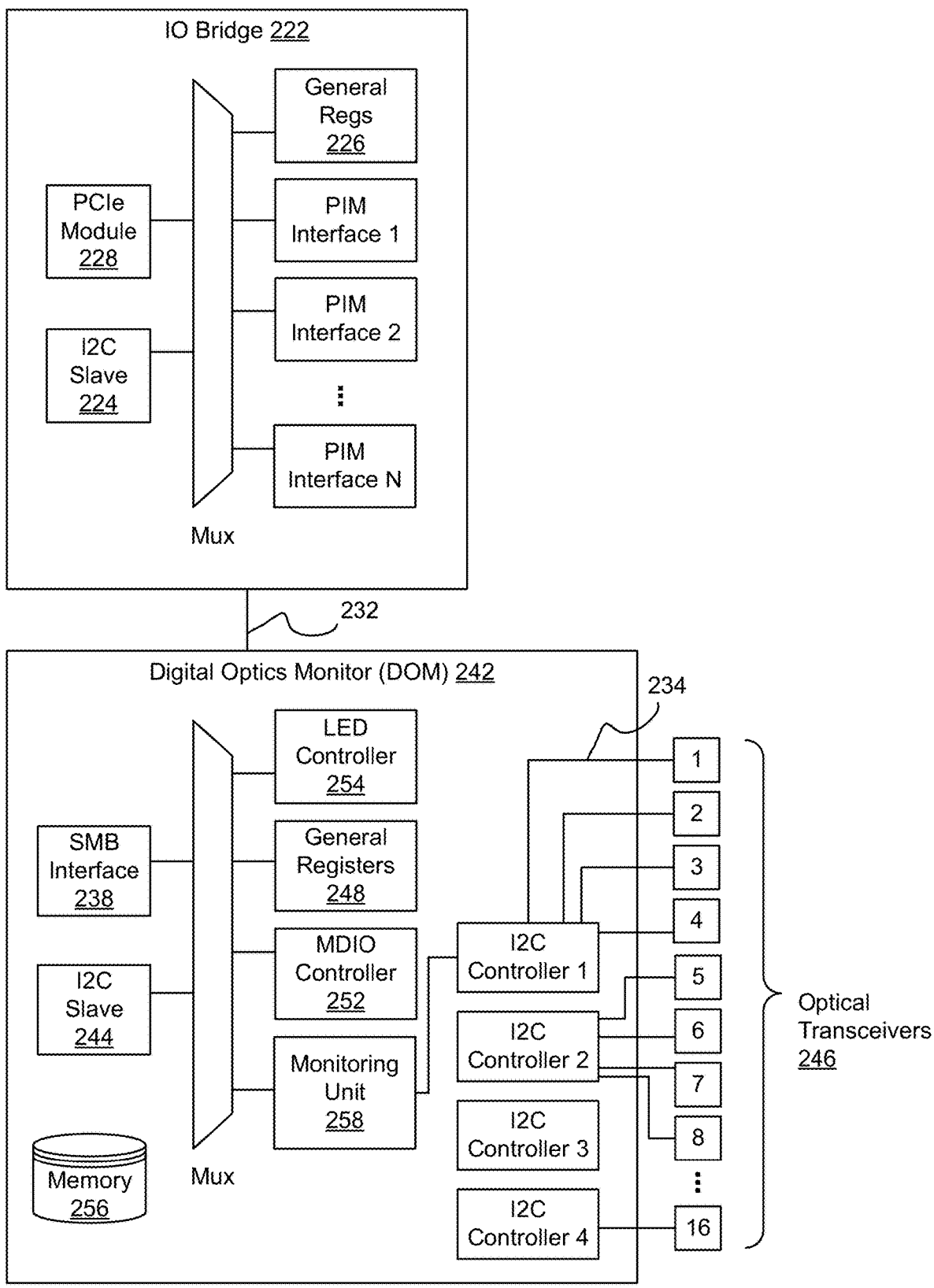
FIG. 2 is a block diagram illustrating an embodiment of a system for monitoring digital optics.

FIG. 2 is a block diagram illustrating an embodiment of a system for monitoring digital optics. The system includes IO bridge 222 and digital optics monitor 242, which are like their counterparts in FIG. 1. The system is configured to monitor optical transceivers 246. The IO bridge can be coupled to an external component such as a CPU (CPU 118 of FIG. 1). For purposes of illustration external components such as the CPU are not shown.

IO bridge 222 is configured to convert signals between a CPU (e.g., PCIe) and port interface modules (e.g., LPC). In various embodiments, the IO bridge is an interface between digital optics manager 242 and other components in a network switch such as a CPU. The IO bridge includes a PCIe endpoint module 228, an I2C slave 224, general registers 226, and one or more port interface module (PIM) interfaces. A multiplexer may be provided to allow selection between several inputs. The PIM interfaces map to the PIMs and may be implemented by a standardized LPC module or proprietary LPC module.

Digital optics monitor 242 includes a switch main board (SMB) interface 238 (corresponding to connection 232), monitoring unit 258, an I2C slave 244, one or more I2C controllers for optical transceivers 246, general registers 248, LED controller 254, MDIO controller 252, and local memory 256. SMB interface 238 is configured to communicate with IO Bridge 222 via a PIM interface.

Monitoring unit 258 is configured to collect data from optical transceivers 246 such as optics monitoring and diagnostics data. The monitoring unit can be configured to perform the process shown in FIG. 3, which accelerates digital optics monitoring by pre-polling for data via relatively slow connection 234 so that the data is ready to transmit via relatively faster link 232 when a CPU requests the data. This means that the optical transceiver links 234 are no longer a bottleneck because when a CPU requests data it is not waiting for the data to be collected via the slow links because the data (or perhaps slightly older data) is already available. In various embodiments, the monitoring unit pre-polls the optical transceivers and transmits the data via LPC bus 132, which is faster than I2C bus 134. Unlike a conventional optical monitoring scheme where a CPU instructs an I2C controller to transmit data on demand, the monitoring unit can collect this data over time and transmit it when needed by the CPU.

I2C slave 244 is configured to receive instructions from a master such as a remote board management controller. The board management controller accesses the digital optics monitor over I2C slave interface 244. The I2C slave provides an access path for the board management controller to collect data from the optical transceivers. For example, the maximum temperature of the transceivers is retrieved via the I2C slave interface by the board management controller as input for thermal policy software as further described with respect to FIG. 5.

The I2C controllers are configured to communicate with the optical transceivers 246 via I2C connections. The I2C controllers can send commands in parallel, which saves time compared with conventional systems in which an external requestor sequentially requests data from each optical transceiver. In this example, 16 ports (optical transceivers) are supported by four I2C controllers. Although the I2C controllers and optical transceivers are depicted in a one-to-four relationship, and I2C controller may be in another type of one-to-many relationship or a one-to-one relationship. In various embodiments, the digital optics monitoring techniques described here makes the I2C bus more efficient by supporting consecutive I2C access. Multiple (e.g., four) I2C controllers can work simultaneously to parallel the data transaction meaning that the monitoring unit 258 can obtain status information from several optical transceivers in parallel.

Traditional I2C access typically involves several steps of toggling I2C mux configurations before reaching the target I2C slave devices. In addition, traditional I2C master supports only a single byte or word transfer. The techniques disclosed here offloads optical transceiver I2C access burden from the CPU or board management controller to monitoring unit 258. The monitoring unit interacts with I2C slaves directly without needing I2C mux involvement. The monitoring unit is configured to determine when to insert an optical transceiver page change and/or bank change I2C transaction automatically.

Management data input/output controller (MDIO) 252 is configured to help a network switch in which this system is provided to communicate with physical layer devices. In conventional systems there is a separate MDIO interface from the switch device. The MDIO controller 252 performs MDIO functions so that a separate MDIO interface is not needed because controller 252 enables digital optics monitor 242 to communicate with physical layer devices.

The MDIO controller can improve MDIO throughput compared with conventional systems. In this system, there are two MDIO paths: one is through a switch chip on the switch main board and the other is through DOM 242. Typically, the PCIe link for the switch chip is a later generation than the PCIe link for DOM 242, which means that the switch chip MDIO path it is typically faster than the DOM MDIO path. However, the MDIO throughput through the DOM path can be improved (latency decreased) as follows.

There is a 6 μs idle state between two consecutive MDIO transactions in MDIO transactions sent over the CPU MDIO path. During this idle state, the PCIe issues commands to the MDIO controller to collect MDIO status/data and to start the next transaction. MDIO 252 controller can be thought of as a data controller that sends a preamble while waiting for a data communication transaction. The MDIO controller is configured to begin sending a MDIO preamble in parallel while it waits for the PCIe commands so that the idle state is greatly reduced. In various embodiments, instead of being idle for 6 μs, the MDIO controller is only idle for 0.4 μs because it takes advantage of the idle state to begin sending the MDIO preamble. This technique of sending the preamble during the idle state can be practiced at various MDC clock speeds including for example 2.5 MHz, 5 MHz, 6.25 MHz, and 8.3 MHz.

General registers 248 are configured to store data such as parameters and values to provide general control and status access of the digital optics monitor 242. For example, the general registers stores the version (e.g., FPGA revision), scratch pad, up time counter, interrupt status, reset control, etc.

LED controller 254 is configured to output an LED stream to drive LEDs on a user interface of a PIM. The LED controller receives a lighting control command from an external requestor (e.g., CPU 118) and uses this command to determine/output an LED stream to drive LEDs on the PIM. For example, a network switch such as Facebook® Minipack has LEDs on its ports on the PIMs to signal information about the port's status using a color, series of blinks, etc. An example of a network switch with port LEDs is shown in FIG. 6.

LED controller 254 is the data source that drives a port's LED decoding circuit. User port LEDs are conventionally driven by a switch circuit on the switch main board such as a switch ASIC or physical layer device (PHY). The switch circuit is sometimes provided by a third party so that the software (data stream format) needs to be reconfigured when a new vendor-supplied ASIC/PHY is used. Configuring LED controller 254 to generate data to drive LEDs allows this system (rather than a third party) to control how the LEDs are used to signal information in a user interface. In other words, by using LED controller 254 as the data source, network switch designs can use the same register interface to drive user port LEDs without needing to adapt an LED interface each time a new ASIC or PHY is used.

LED controller 254 is configured to drive a variety of LED devices. For example, the LED controller can directly drive a network switch such as Facebook® Minipack. As another example, the LED controller can drive LED devices through serial-to-parallel shifter devices if LED 10 demand is beyond what the digital optics monitor 242 can support, or a mix of both example approaches.

Memory 256 is configured to store data such as digital optics data collected from optical transceivers 246. As further described below with respect to the process of FIG. 3, optical transceiver data (e.g., temperature, voltage, etc.)

and an associated timestamp is cached in memory 256. In various embodiments, memory 256 stores an initial/provisional configuration file received from an external requestor (e.g., CPU 118 of FIG. 1) that specifies how/what data is to be collected by monitoring unit 258. Any suitable memory device such as embedded memory can be used to implement memory 256. When an external requestor asks for digital optics monitoring data (e.g., transceiver temperature, voltage, etc.), memory 256 can quickly provide this information and transmit it over the relatively fast link 232.

The number of PIM interfaces, I2C controllers, and optical transceivers are merely exemplary and not intended to be limiting. For example, although the I2C controller and optical transceivers are depicted in a one-to-four relationship, they may instead by another one-to-many relationship or one-to-one relationship. As another example, a single SMB interface 238 is shown but in some embodiments there are eight SMB interfaces for a network switch. I2C is used as an example of a protocol for communications with optical transceivers, but this is not intended to be limiting. The techniques described here can be applied to other types of form factors and protocols such as Serial Peripheral Interface (SPI), MDIO, etc.

The system is easily scalable. For example, the system can support 32 port optical transceivers per digital optics monitor and the system can be scaled to support as many digital optics monitor as needed (e.g., based on optical transceivers accepted by a network switch). The system can be configured to support on-board optics.

The operation of the system shown here will be described using the process shown in the next figure.

Figure 3:
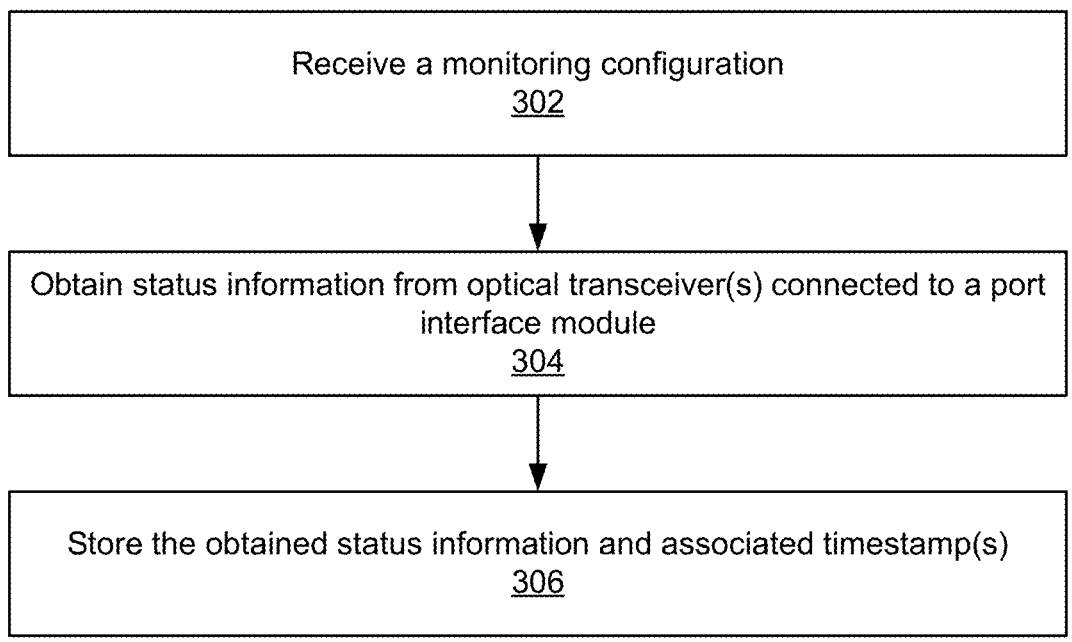
FIG. 3 is a flow chart illustrating an embodiment of a process for monitoring digital optics.

FIG. 3 is a flow chart illustrating an embodiment of a process for monitoring digital optics. This process may be implemented by digital optics monitor 142 or 242 shown in FIGS. 1 and 2.

The process begins by receiving a monitoring configuration (302). The monitoring configuration can be received from an external source as CPU 118 of FIG. 1. The configuration file specifies what data to collect. The configuration is sent once initially and need not be repeatedly sent whenever optical data is needed. An example of a configuration file is shown in the next figure.

The process obtains status information from optical transceiver(s) connected to a port interface module (304). Status information may include temperature, current, supply voltage, optical power such as RX power, TX bias, TX power, interrupt status, and other parameters including those defined by standards bodies such as SNIA. Status information may be used to flag transceiver issues or optimize the functioning of the network switch.

The process stores the obtained status information and associated timestamp(s) (306). The timestamp corresponds to a time at which the status information was obtained and enables a requestor to get historical data such as a temperature of an optical transceiver at a particular time. Conventional system typically store only the current value (without a timestamp) so that historical data cannot be obtained. The process stores the information and timestamp in local storage such has memory 256 of FIG. 2.

FIG. 4 illustrates an example of register definitions and contents obtained in some embodiments. Referring to FIG. 1, system control module 110 (e.g., master) provides specification/configuration of transceiver status information to be monitored using a configuration file that is provided to one or more DOMs 142 (e.g., slaves) of port interface module 140. The DOM then obtains the requested transceiver status information from the transceivers using its monitoring unit (e.g., unit 258 of FIG. 2). The DOM stores/provides collected transceiver status information using a descriptor file. An example of DOM 142 is DOM 242 of FIG. 2.

A slave device can be configured upon startup using a configuration file to set the behavior of the device. Configuration file 400 of FIG. 4 is an example of a configuration that a system control module sends to a DOM to specify the transceiver status information to be collected by its monitoring unit.

In some embodiments, the way that a master (e.g., SCM/CPU) and slave (DOM) exchange information is by reading from and/or writing to registers/memory of the slave device, where the registers are locations in the slave's memory containing information such as sampled data to be sent back to the master or configuration information defining the slave's behavior. The master writes information into registers/memory to instruct the slave to perform a specified task. The master reads information from the registers/memory by sending the slave a register address of the register the master wishes to read from. The slave then transmits back data at the indicated register address. In alternative embodiment, the master provides a command to the slave to store and/or retrieve information.

Configuration file 400 includes a "start" field storing a memory address offset of an optical transceiver memory where the desired transceiver status information is stored and to be read from. The monitoring unit is then configured to read from this memory offset address of the memory of one or more connected transceiver to obtain the desired status information from the transceiver(s). The configuration file also includes the number of bytes to poll/read. The configuration file may also include how often to poll (which can be defined as a period, cycle, etc.). For example, the configuration file includes a specification of a periodic cycle of when the status information is to be obtained from the transceiver(s). The commit flag refers to when the desired status information collected can be commenced. For example, status information collection starts when this flag is set.

The "STA" field includes a status such as whether data collection is complete (or more specifically which port(s)/transceivers have been completed). For example, configuration file 400 stored in a storage of the DOM can also be used track/report a status of information collection requested by the configuration file by updating this STA field. The "seq" field stores an assigned sequence number used to identify a numerical sequence associated with the configuration file, and the "time" field stores an identification of a time value corresponding to the assigned sequence number (e.g., data labeled using the sequence number in the "seq" field was collected approximately at the time value identified in the "time" field). For example, the value stored in the "time" value can be a timestamp or a time value relative to a time reference corresponding to a system up time. The sequence number and/or time value can be used to label when status information has been obtained from optical transceivers.

Descriptor file 410 (e.g., stored in a storage of a digital optics monitor) stores data collected from the optical transceivers. In this example descriptor file 410 includes four pages, where each page includes corresponding space for each transceiver corresponding to each of the 16 ports in the example system of FIG. 2. The descriptor is configured to support four pages of digital optics monitoring data per port and four pages of real time data per port with each page being up to 128B in size. The descriptor file includes a timestamp and/or a sequence number for stored data entries.

The sequence number can be assigned by the monitoring unit or other device based on the sequence number and/or time value specified in a corresponding configuration file (e.g., configuration file 400) to differentiate entries of this descriptor file from entries corresponding earlier or later collected data. This allows historical optical transceiver status data to be timestamped and stored and later analyzed based on the timestamp by an external requestor such as a CPU.

In various embodiments, the configuration file described above applies to all ports. In order to read or write data from a specific optical transceiver/port at a specific instance in time, monitoring unit 258 (e.g., in response to a command received from a SCM/CPU) may send an ad-hoc real-time command (RTC). Each transceiver device has a specific channel ID, which can be used to differentiate between devices connected on the same I2C controller.

Figure 5:
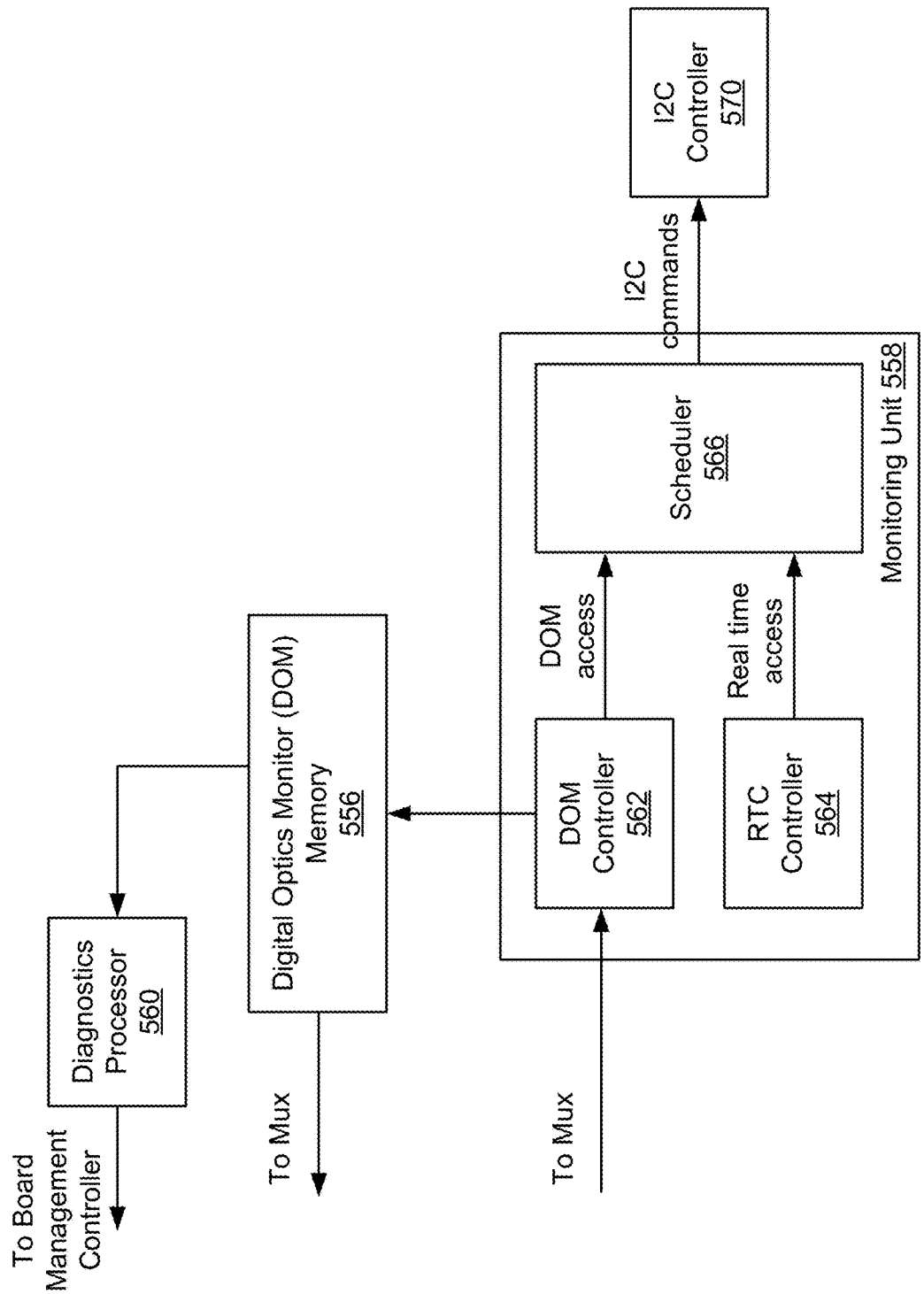
FIG. 5 shows an example of a system for scheduled and real time access for digital optics monitoring according to an embodiment of the present disclosure.

FIG. 5 shows an example of a system for scheduled and real time access for digital optics monitoring according to an embodiment of the present disclosure. This system configured to permit automatic/scheduled digital optics monitoring as well as real time access. The system includes monitoring unit 558, diagnostics processor 560, and memory 556. In this example DOM controller 562 and RTC controller 564 are configured in parallel and arbitrated by scheduler 566.

DOM controller 562 is configured to send a configuration file to optical transceivers and read from the optical transceivers according to the techniques described above.

RTC controller 564 is configured to provide an ad-hoc access command to access a status memory of the transceivers. For example, the RTC controller sends a command to the optical transceivers to access them in real time. For example, if a CPU wants to know a specific reading that is not readily available in memory 556 (e.g., previously collected according to a schedule based on configuration file 400), the CPU can access the transceivers in real time by sending a command via the RTC controller which specifies an address of a particular transceiver from which to read data.

Scheduler 566 is configured to schedule the ad-hoc access command the periodic access commands based on the monitoring configuration. For example, the scheduler arranges the command to avoid conflicts.

Diagnostics processor 560 is configured to process digital optics diagnostics data such as temperature, voltage, etc. Using the example of temperature processing, processor 560 reads temperature from the optical transceivers to determine an action to improve network switch functioning. The system decodes optical transceiver temperature data and reports the highest temperature per PIM card as follows. Diagnostics processor 560 reads all incoming channels of temperature readings reported by I2C controller 570. Diagnostics processor 560 searches for the highest temperature value of the 16 optical transceivers on a port interface module card. The highest temperature can be used for a variety or optimization such as by inputting to a thermal policy software to control a system fan speed.

The number of channels is exemplary and not intended to be limiting. In this example the DOM memory 556 is at least 2 kB for (128B*4 descriptors*4 channels*8b). Only one quad channel group is shown but in some embodiments there are four such independent quad groups in a DOM to support a total of 16 optical transceivers.

In various embodiments, a thread ID register provides shared resource access control among multiple threads. Once this register is locked by a thread, other threads that could cause conflicts wait for the previous thread to unlock this register before the next register can take control of this register to access the shared resource.

The techniques for monitoring digital optics finds application in a variety of settings such as the example switch system shown in the next figure.

FIG. 6 is a diagram illustrating an embodiment of a system for monitoring digital optics. Chassis 600 is an example of a network switch that includes a number of slots 640 to accommodate interface modules (PIMs). The eight slots each accepts a port interface module 650. An example PIM 650 is shown. The PIM includes ports 686 to accept optical transceivers. In this example the PIM accommodates 16 optical transceivers. Examples of optical transceivers include QSFP and QSFP-DD, which are further described below. One or more LEDS 684 may be provided on the PIM 650 as a user interface to signal information such as status of the various PIM slots or optical transceivers. The LEDs can be driven by an LED controller such as the one described above. In various embodiments, LED 684 supports eight color profiles to be chosen from 4095 color patterns. Any color from the eight color profiles can be assigned to any port and enable solid on/off control or flashing control. PIM 650 also includes other components such as a connector 682 to a switch main board (e.g., 120 of FIG. 1).

An interface module (also called a port interface module or PIM) provides access operations. An interface module can be part of a network switch, which is in turn mounted on a server rack. An interface module receives data packets and forwards the data packets to the appropriate destination. For example, an interface module receives an optical signal, converts the signal to a signal for a switch chip, and sends the signal to the switch chip, to then route the signal to a destination. The interface module allows processing units (CPUS, GPUs, or the like) to be easily repaired or replaced while other components of the network switch remain in place. For example, removable network switch interface modules are housed in the chassis, where each of the removable network switch interface modules includes a circuit board with associated switch circuitry.

An interface module supports a variety of card configurations such as Quad Small Form-factor Pluggable (QSFP), dense wavelength division multiplexing (DWDM), and the like. One type is a QSFP network switch which has 16 slots supporting 100G per slot. Another type is a QSFP-DD network switch, which has 4 slots supporting 400G per slot. Other configurations are also possible, such as 8×QSFP56 200G. In some embodiments, within a chassis, one or more types of network interfaces are used. A chassis may include all network interfaces of the same type or more than one type of network interface. The modular, replaceable nature of the network interfaces allow them to be easily replaced, removed, and mingled in the same chassis.

A plurality of these interface modules can be installed in a modular network switch device chassis. They may each be arranged next to each other in the front portion of the chassis. Each may have one or more ejectors for installing and retaining the interface module in position in the chassis, and later removing the interface module.

The switch described above and the techniques for monitoring digital optics find application in a variety of computer networks such as the example computer network shown in the next figure.

Figure 7:
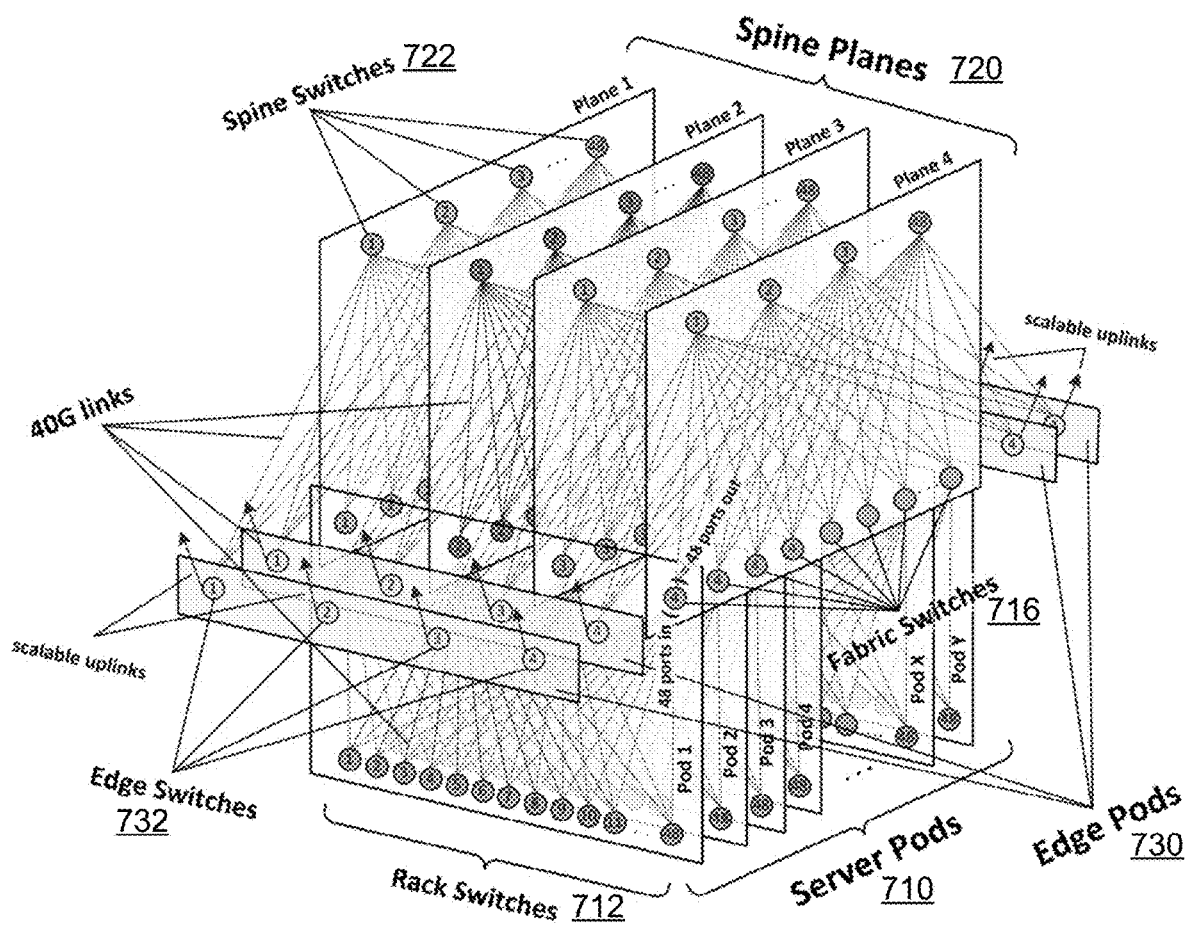
FIG. 7 shows an example of a data center network topology in which digital optics can be monitoring according to the disclosed techniques.

FIG. 7 shows an example of a data center network topology in which digital optics can be monitoring according to the disclosed techniques. Unlike conventional data centers that use large devices and clusters connected together in a large mesh, the network here is disaggregated in the sense that smaller identical network units (e.g., server pods 710) are used and interconnected using various different network planes. The server pods are communicatively coupled to each other, e.g., by high-performance links.

In various embodiments, a server pod is a standard "unit of network," and functions as a logical switch. Each server pod includes fabric switches 716 and rack switches 712 (sometimes called top of rack or TOR switches). In this example, each pod is served by a set of four fabric switches for a 3+1 four-post architecture for server rack TOR uplinks, where each TOR has 4×40G uplinks, providing a total of 160G bandwidth capacity for a rack of 10G-connected servers. A server pod may be much smaller than a unit of network in a conventional data center, e.g., the server pod here has 24 server racks. This size may be advantageous because most basic mid-size switches can service the pods. A relatively smaller port density of fabric switches makes the internal architecture simple, modular, and robust.

In FIG. 7, there are four spine planes 720, which are independent planes of spine switches 722. In this example, each spine plane is scalable up to 48 independent devices within the plane. Each fabric switch of each pod connects to each spine switch within its local plane. Together, the pods and planes form a modular network topology capable of accommodating hundreds of thousands of 10G-connected servers.

External connectivity (e.g., to external network) is provided by edge pods 730, which has edge switches 732 to which deliver data to the backbone and to back-end internal fabrics. For example, the edge pods can provide around 7.68 Tbps to the backbone and is callable to 100G and higher port speeds within the same device form factors. The network topology is scalable. In this regard, the number of fabric switches and rack switches can be increased or decreased to meet performance goals. Server pods can be added to provide more compute capacity, spine switches can be added for more intra-fabric network capacity, and edge pods or scale uplinks can be added for more extra-fabric connectivity.

The number, placement, and capacity of planes, switches, and links shown here are merely exemplary and not intended to be limiting. One or more of the switches (e.g., spine switches, fabric switches, and edge switches) can be implemented using a plurality of physical component switches that together form a single logical switch.

Referring again to the rack switches 712, a rack switch provides control of one or more racks by managing components within the rack and facilitating communications between racks. An example of a rack switch is a Facebook® Wedge switch, which is an OS-agnostic switch that includes a server module. Components such as the server module in the Wedge switch can be easily modified and replaced according to networking needs and when new technology becomes available. Another example of a switch is a modular network switch such as Facebook® Backpack and Facebook® Minipack.

A modular network switch includes a device chassis that can be mounted to a server rack. The device chassis is adapted to house modular removable components such as interface modules (also called port interface modules or PIMs) and a system control module. The system control module is a processing unit configured to manage the interface modules and can be plugged into the chassis. For example, the system control module manages networking policies, temperature control, power distribution, and the like. Each of the interface modules includes a port for receiving data from an external device in a network and at least one application-specific integrated circuit (ASIC) for data forwarding (e.g., gearbox).

The techniques disclosed above accelerate digital optics monitoring. In various embodiments, there is one input/output block (IOB) FPGA on a switch circuit board (SMB) and it is connected to the CPU by a PCIe link. The IOB FPGA talks to a digital optics monitoring FPGA on each PIM through a local bus. The digital optics monitoring FPGA periodically polls the optics modules for digital optics monitoring information through the low-speed I2C buses, and the CPU only needs to read such information from the FPGAs through the high-speed PCIe link (and avoids doing direct I2C bus accesses which are slow).

Performance improvements have been observed in systems that use the techniques described above. For example, I2C access is improved. Using the example in which an I2C bus supports consecutive I2C access up to 128B, a conventional design would take 128*128B*8b/B*10 μs=1.3 s to complete data collection. With overhead, it would take double or around 2.6 s to complete data collection. By contrast, the monitoring unit can complete the same task with optical transceiver I2C running at the same speed in 4*128B*8b/B*10 μs=41 ms with minimum overhead. This means that digital optics monitoring is accelerated to be 32 times faster using the techniques disclosed here compared with conventional techniques. As another example, MDIO through is improved by beginning to send the preamble during the idle state. At 2.5 MHz, the DOM MDIO path is faster than a CPU MDIO path.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a digital optics monitor included in a port interface module on a network switch and configured to:
        receive a monitoring configuration;
        at an instance based on the monitoring configuration, obtain status information from a plurality of optical transceivers connected to the port interface module; and
        store the obtained status information and at least one associated timestamp in a memory; and
    the memory included in the port interface module and configured to provide the stored status information to a requestor external to the port interface module over a connection configured to transmit at a higher speed than a connection between the port interface module and the plurality of optical transceivers.

2. The system of claim 1, wherein the external requestor is a switch circuit board of a computer network switch.

3. The system of claim 1, wherein the plurality of optical transceivers includes at least one of: Quad Small Form-factor Pluggable (QSFP) transceiver, Quad Small Form-factor Pluggable Double Density (QSFP-DD), or On-Board Optics (OBO).

4. The system of claim 1, wherein the status information includes digital optics diagnostic data.

5. The system of claim 1, wherein the digital optics monitor and the plurality of optical transceivers communicate over an Inter-Integrated Circuit (I2C) bus.

6. The system of claim 1, wherein the digital optics monitor is configured to obtain status information from the plurality of optical transceivers at least partially in parallel.

7. The system of claim 1, wherein the digital optics monitor is configured to provide real time Inter-Integrated Circuit (I2C) bus access to the plurality of optical transceivers.

8. The system of claim 1, further comprising a first Inter-Integrated Circuit (I2C) controller is associated with at least one optical transceiver.

9. The system of claim 8, further comprising a second Inter-Integrated Circuit (I2C) controller associated with at least one optical transceiver, wherein the first I2C controller and the second I2C controller are configured to send commands to their respective at least one optical transceiver in parallel.

10. The system of claim 1, further comprising a light emitting diode (LED) control unit included in the port interface module and configured to receive a lighting control command from the requestor external to the port interface module.

11. The system of claim 1, wherein the monitoring configuration specifies a memory address location where at least a portion of the status information is stored in a memory of at least one of the optical transceivers.

12. The system of claim 1, wherein the monitoring configuration specifies a periodic cycle schedule of when the status information is to be obtained from the optical transceivers.

13. The system of claim 1, wherein the associated timestamp includes an associated sequence number.

14. The system of claim 1, wherein the monitoring configuration specifies a sequence number to be used in determining the associated timestamp.

15. The system of claim 1, wherein the obtained status information is stored in a descriptor file labeled using the associated timestamp corresponding to an approximate time when the obtained status information was obtained.

16. The system of claim 1, further comprising a real time controller included in the digital optics monitor and configured to provide an ad-hoc access command to access a status memory of at least one of the plurality of optical transceivers.

17. The system of claim 16, further comprising a scheduler included in the digital optics monitor and configured to schedule the ad-hoc access command and one or more periodic access commands based on the monitoring configuration.

18. The system of claim 1, further comprising a data controller included in the port interface module and configured to send a preamble while waiting for a data communication transaction.

19. A method comprising:
  receiving a monitoring configuration at a digital optics monitor included in a port interface module on a network switch;
  at an instance based on the monitoring configuration, obtaining status information from a plurality of optical transceivers connected to the port interface module;
  storing the obtained status information and at least one associated timestamp in a memory; and
  providing the stored status information to a requestor external to the port interface module over a connection configured to transmit at a higher speed than a connection between the port interface module and the plurality of optical transceivers.

20. A computer program product embodied in a non-transitory computer readable storage medium and comprising computer instructions which when executed by a processor cause the processor to:
  receive a monitoring configuration at a digital optics monitor included in a port interface module on a network switch;
  at an instance based on the monitoring configuration, obtain status information from a plurality of optical transceivers connected to the port interface module;
  store the obtained status information and at least one associated timestamp in a memory; and
  provide the stored status information to a requestor external to the port interface module over a connection configured to transmit at a higher speed than a connection between the port interface module and the plurality of optical transceivers.

* * * * *